US009788043B2

(12) United States Patent
Davis et al.

(10) Patent No.: US 9,788,043 B2
(45) Date of Patent: Oct. 10, 2017

(54) CONTENT INTERACTION METHODS AND SYSTEMS EMPLOYING PORTABLE DEVICES

(75) Inventors: Bruce L. Davis, Lake Oswego, OR (US); Tony F. Rodriguez, Portland, OR (US); Brian T. MacIntosh, Lake Oswego, OR (US); William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 2525 days.

(21) Appl. No.: 12/271,772

(22) Filed: Nov. 14, 2008

(65) Prior Publication Data

US 2010/0119208 A1    May 13, 2010

Related U.S. Application Data

(60) Provisional application No. 61/112,573, filed on Nov. 7, 2008.

(51) Int. Cl.
*H04N 5/91* (2006.01)
*H04N 21/414* (2011.01)
(Continued)

(52) U.S. Cl.
CPC ...... *H04N 21/41407* (2013.01); *H04H 60/27* (2013.01); *H04H 60/372* (2013.01);
(Continued)

(58) Field of Classification Search
CPC .................................................. H04N 5/765
(Continued)

(56) References Cited

U.S. PATENT DOCUMENTS 6,118,923 A    9/2000    Rodriguez
6,177,931 B1   1/2001    Alexander et al.
(Continued)

FOREIGN PATENT DOCUMENTS

JP    2000-268441    9/2000
JP    2001-128076    5/2001
(Continued)

OTHER PUBLICATIONS

"Advertisers," Advonce Networks, 2008, 1 p.
(Continued)

*Primary Examiner* — William C Vaughn, Jr.
*Assistant Examiner* — Luis Perez Fuentes
(74) *Attorney, Agent, or Firm* — Digimarc Corporation

(57) ABSTRACT

A portable device, such as a cell phone, is used to "forage" media content from a user's environment. For example, it may listen to a television viewed by a traveler in an airport lounge. By reference to digital watermark or other data extracted from the content, the device can identify the television program, and enable a variety of actions. For example, the device may instruct a DVR to record the remainder of the television program—or determine when the program will be rebroadcast, and instruct the DVR to record the program in its entirety at that later time. The device may also identify content that preceded (or follows) the foraged content. Thus, a user who tunes-in just at the end of an exciting sporting event can capture one of the following commercials, identify the preceding program, and download same for later viewing. In other aspects, a cell phone can be used as a "second screen," through which a user can interact with ambient content—such as reviewing electronic program guide data, or enjoying interactive television features. A great variety of other functions and arrangements are also detailed.

27 Claims, 7 Drawing Sheets

(51) Int. Cl.

| | | |
|---|---|---|
| *H04N 5/765* | (2006.01) | |
| *H04N 7/173* | (2011.01) | |
| *H04N 21/2389* | (2011.01) | |
| *H04N 21/4227* | (2011.01) | |
| *H04N 21/433* | (2011.01) | |
| *H04N 21/439* | (2011.01) | |
| *H04N 21/44* | (2011.01) | |
| *H04N 21/8358* | (2011.01) | |
| *H04H 60/27* | (2008.01) | |
| *H04H 60/37* | (2008.01) | |
| *H04H 60/61* | (2008.01) | |
| *H04H 60/91* | (2008.01) | |

(52) U.S. Cl.
CPC ............ *H04H 60/61* (2013.01); *H04H 60/91* (2013.01); *H04N 5/765* (2013.01); *H04N 7/17318* (2013.01); *H04N 21/23892* (2013.01); *H04N 21/4227* (2013.01); *H04N 21/4334* (2013.01); *H04N 21/4394* (2013.01); *H04N 21/44008* (2013.01); *H04N 21/8358* (2013.01)

(58) Field of Classification Search
USPC .......................................................... 386/291
See application file for complete search history.

(56) References Cited

U.S. PATENT DOCUMENTS

| | | | |
|---|---|---|---|
| 6,215,526 B1 | 4/2001 | Barton et al. | |
| 6,311,214 B1 | 10/2001 | Rhoads | |
| 6,314,577 B1 | 11/2001 | Pocock | |
| 6,341,195 B1 | 1/2002 | Mankovitz et al. | |
| 6,411,725 B1 | 6/2002 | Rhoads | |
| 6,522,769 B1 | 2/2003 | Davis et al. | |
| 6,829,368 B2* | 12/2004 | Meyer ................... | G06T 1/0021 348/E7.071 |
| 7,111,170 B2 | 9/2006 | Rhoads et al. | |
| 7,227,972 B2 | 6/2007 | Hannigan et al. | |
| 7,263,202 B2 | 8/2007 | Davis | |
| 7,302,574 B2* | 11/2007 | Conwell ................ | G06Q 30/02 704/E15.045 |
| 7,421,723 B2 | 9/2008 | Harkness | |
| 7,552,193 B2 | 6/2009 | Carro | |
| 7,562,392 B1 | 7/2009 | Rhoads | |
| 7,590,259 B2 | 9/2009 | Levy | |
| 7,647,613 B2 | 1/2010 | Drakoulis et al. | |
| 7,676,060 B2 | 3/2010 | Brundage et al. | |
| 7,693,965 B2 | 4/2010 | Rhoads | |
| 7,751,596 B2 | 7/2010 | Rhoads | |
| 7,970,167 B2 | 6/2011 | Rhoads | |
| 7,983,614 B2 | 7/2011 | Dunko et al. | |
| 8,116,516 B2 | 2/2012 | Rhoads | |
| 8,121,843 B2 | 2/2012 | Rhoads et al. | |
| 8,516,533 B2* | 8/2013 | Davis ................... | H04N 21/482 725/115 |
| 9,237,368 B2* | 1/2016 | Davis ................ | H04M 1/72533 |
| 9,292,894 B2* | 3/2016 | MacIntosh ............ | G06T 1/0021 |
| 2001/0013124 A1 | 8/2001 | Klosterman et al. | |
| 2002/0048448 A1 | 4/2002 | Daniels | |
| 2002/0162118 A1 | 10/2002 | Levy et al. | |
| 2003/0012548 A1* | 1/2003 | Levy ..................... | G06F 21/125 386/251 |
| 2003/0018748 A1 | 1/2003 | McKenna | |
| 2003/0188322 A1 | 10/2003 | Bontempi | |
| 2004/0015989 A1 | 1/2004 | Kaizu | |
| 2004/0155888 A1* | 8/2004 | Padgitt ................. | G06F 3/04817 345/619 |
| 2004/0183912 A1* | 9/2004 | Szolyga et al. ............ | 348/207.1 |
| 2005/0122391 A1 | 6/2005 | Fukuda | |
| 2005/0122435 A1 | 6/2005 | Yumoki | |
| 2005/0210417 A1 | 9/2005 | Marvit et al. | |
| 2006/0031684 A1 | 2/2006 | Sharma et al. | |
| 2006/0052081 A1 | 3/2006 | Cho | |
| 2006/0174348 A1 | 8/2006 | Rhoads | |
| 2007/0124775 A1 | 5/2007 | DaCosta | |
| 2007/0250194 A1 | 10/2007 | Rhoads | |
| 2008/0034038 A1 | 2/2008 | Ciudad et al. | |
| 2008/0052945 A1 | 3/2008 | Matas et al. | |
| 2008/0062141 A1 | 3/2008 | Chandhri | |
| 2008/0066016 A1 | 3/2008 | Dowdy et al. | |
| 2008/0091777 A1 | 4/2008 | Carlos | |
| 2008/0122796 A1 | 5/2008 | Jobs | |
| 2008/0184322 A1* | 7/2008 | Blake ............................ | 725/109 |
| 2009/0002335 A1 | 1/2009 | Chaudhri | |
| 2012/0311623 A1* | 12/2012 | Davis ..................... | H04N 5/765 725/18 |
| 2015/0086173 A1* | 3/2015 | Abecassis .......... | H04N 21/4722 386/201 |
| 2015/0086174 A1* | 3/2015 | Abecassis .......... | H04N 21/4884 386/201 |

FOREIGN PATENT DOCUMENTS

| | | |
|---|---|---|
| JP | 2004-200882 | 7/2004 |
| JP | 2006-237753 | 9/2006 |
| JP | 2006-253895 | 9/2006 |
| WO | WO0033576 | 6/2000 |
| WO | WO0199325 | 12/2001 |
| WO | WO2010054222 | 5/2010 |
| WO | WO 2010054222 | 5/2010 |

OTHER PUBLICATIONS

U.S. Appl. No. 09/562,517, filed May 1, 2000.
"Financial Services," Advance Networks, 2008, 1 p.
Fink, et al, Social-and Interactive-Television Applications Based on Real-Time Ambient-Audio Identification, EuroITV 2006, 10pp.
"Offer Manager," Advonce Networks, 2008, 3 pp.
PCT International Search Report, PCT/US2009/063585 (WO2010054222), Mar. 9, 2010.
PCT Written Opinion of the Int'l Searching Authority, PCT/US2009/063585 (WO2010054222), Mar. 9, 2010.
"Transaction Manager," Advance Networks, 2008, 3 pp.
Prosecution excerpts from European patent application 09825495.6 (based on corresponding PCT application WO2010054222), namely amended claims presented for examination on Mar. 31, 2014; EPO Action dated Sep. 8, 2015; response to EPO and amended claims filed Jan. 18, 2016; EPO Action dated Apr. 22, 2016; and response to EPO and amended claims filed Oct. 31, 2016.
Prosecution excerpts from Chinese patent application 200980154011.2 (based on corresponding PCT application WO2010054222), namely amended claims presented on Jun. 28, 2013, after unity-of-invention rejection; Notification of First Action dated Oct. 23, 2013; amended claims filed Mar. 7, 2014; Second Office Action dated Jul. 14, 2014; amended claims filed Sep. 22, 2014; Notification of Third Action dated Jan. 15, 2015; Final Rejection dated Sep. 17, 2015; and Notification of Reexamination dated Mar. 31, 2016.
Prosecution excerpts from Japanese patent application 2011-534929 (based on corresponding PCT application WO2010054222), namely claims presented for examination, Notice of Reasons for Rejection dated Dec. 10, 2013; amended claims; and Notice of Reasons for Rejection (final) dated Sep. 24, 2014.

* cited by examiner

| SOURCE CODE | TIME CODE | CONTENT |
|---|---|---|
| 1DA7 | 20081105201812 | SOPRANOS, Episode 42<br>ISAN 0100-57DA-867A-0000-B-0000-0000-H |
| 1DA7 | 20081105201814 | COMMERCIAL: Coca Cola, Yao Ming<br>ISAN 0000-3BAB-9352-0000-G-0000-0000-Q |
| 1DA7 | 20081105201817 | COMMERCIAL: Coca Cola, Yao Ming<br>ISAN 0000-3BAB-9352-0000-G-0000-0000-Q |
| ⋮ | ⋮ | ⋮ |
| 1DA7 | 20081105201915 | SOPRANOS, Episode 42<br>ISAN 0100-57DA-867A-0000-B-0000-0000-H |
| 1DA7 | 20081105201918 | SOPRANOS, Episode 42<br>ISAN 0100-57DA-867A-0000-B-0000-0000-H |
| 1DA7 | 20081105201920 | SOPRANOS, Episode 42<br>ISAN 0100-57DA-867A-0000-B-0000-0000-H |
| ⋮ | ⋮ | ⋮ |
| 1DA7 | 20081005202937 | SOPRANOS, Episode 42<br>ISAN 0100-57DA-867A-0000-B-0000-0000-H |
| 1DA7 | 20081005202939 | <no data> |
| 1DA7 | 20081005202942 | <no data> |

FIG. 3

SEARCH FOR: SOPRANOS 42
| DATE/TIME | CHANNEL | EPISODE AND DESCRIPTION |
|---|---|---|
| 11/5/08<br>8:00 pm | 107 | The Sopranos, "Denial, Anger, Acceptance"<br>Episode 42 |
| 11/6/08<br>1:00 am | 107 | The Sopranos, "Denial, Anger, Acceptance"<br>Episode 42 (Repeat) |
| 11/6/08<br>10:00 am | 107 | The Sopranos, "Denial, Anger, Acceptance"<br>Episode 42 (Repeat) |
| 11/11/08<br>3:00 am | 344 | The Sopranos, "Denial, Anger, Acceptance"<br>Episode 42 (Repeat) |
FIG. 4
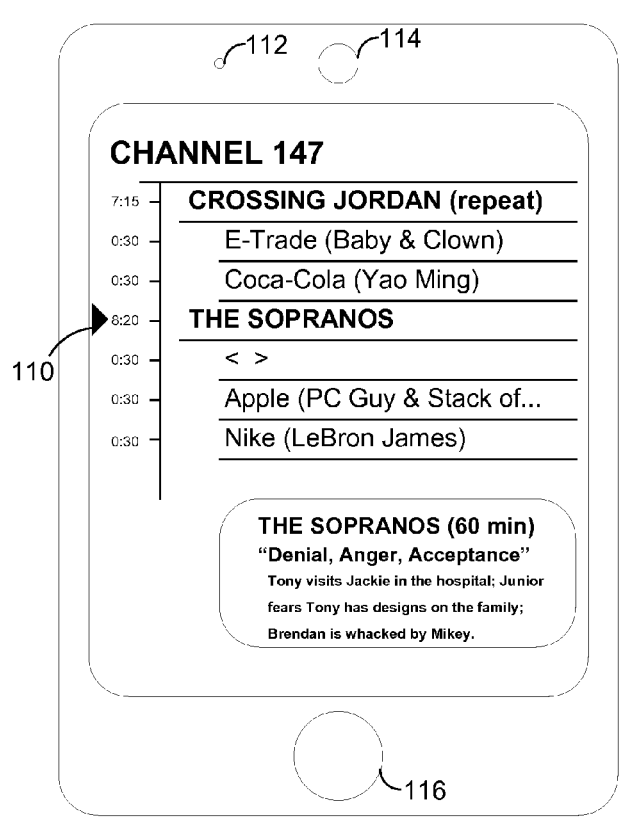
FIG. 5
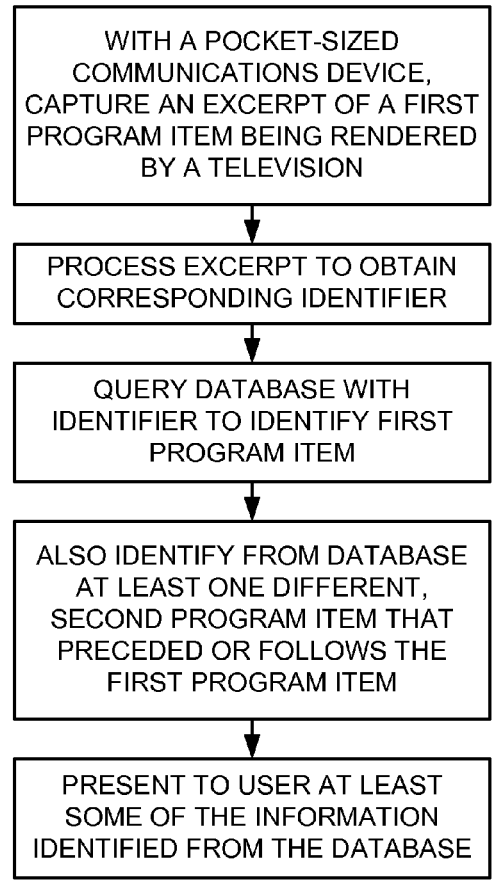
FIG. 6

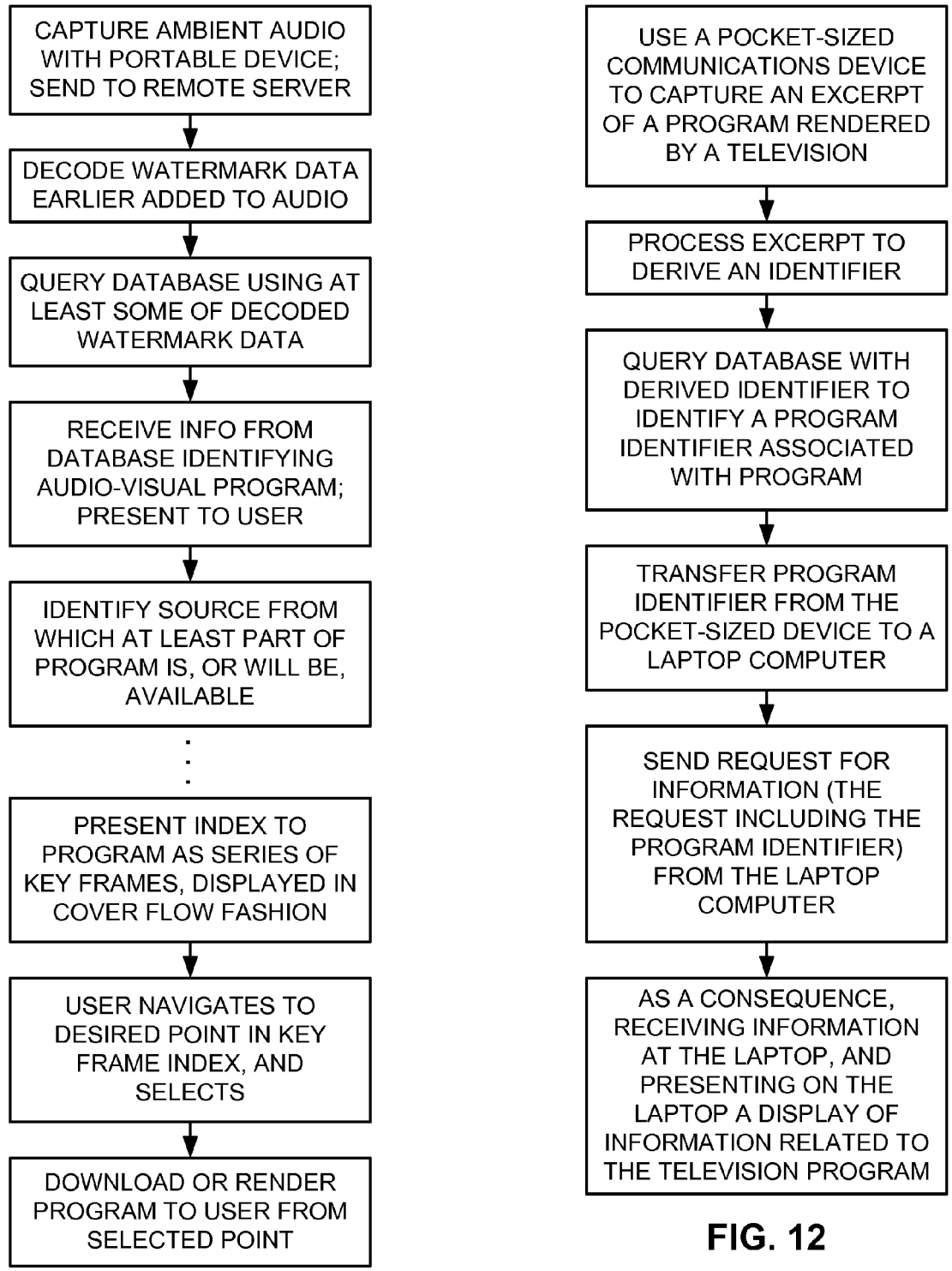

CONTENT INTERACTION METHODS AND SYSTEMS EMPLOYING PORTABLE DEVICES

RELATED APPLICATION DATA

This application claims priority from provisional application 61/112,573, filed Nov. 7, 2008.

BACKGROUND AND INTRODUCTION OF THE TECHNOLOGY

Digital video recorders, such as produced by TiVo, are popular because they allow consumers to watch desired programming at desired times. Programming interfaces for such devices now extend to the web and mobile phones—permitting users to remotely set shows for recording. However, such arrangements are still somewhat limited in their functionality and convenience.

In addition to TiVo, a great variety of other technologies are available to help consumers enjoy entertainment content at times and places of the consumers' choosing (e.g., Apple's iphones, streaming video, etc.). However, these technologies also suffer from a variety of limitations.

The present technology seeks to eliminate certain shortcomings of these existing technologies, and to provide new features not previously contemplated.

Consider a business traveler who learns that his favorite sports team is playing a game during his travels, and wants the game recorded on his home TiVo. Existing web- and cell phone-based programming interfaces allow the user to search for the program in the TiVo program guide by title (or by actor/director, keyword, or category), and instruct the DVR to record.

Sometimes, however, the user doesn't learn of the program until it is underway. In this circumstance, the user may try to hurriedly perform a search for the program on his cell phone, and then instruct the home DVR to start recording. However, he may find this procedure unduly time consuming, and the rushed keyboard data entry both tedious and error-prone.

Sometimes the user doesn't know the correct title of the program, or doesn't guess the correct words by which the program is indexed in TiVo's electronic program guide. In other instances the user is engaged in another activity, and is not able to devote himself to the search/programming tasks with the concentration required.

At best, inception of the DVR recording is delayed; at worst no recording is made.

Consider another example—the traveler is speaking on the cell phone with his daughter when he notices a television documentary of interest (something about the Panama Canal). After concluding his telephone conversation he is disappointed to find that the documentary is ended—he didn't catch its name.

Consider yet another example. The traveler enters the airport lounge in the final seconds of a football game—just after a game-winning touchdown. He wishes he could have seen the end of the game—or at least the post-game highlights—but his flight is about to board. Again, he's left with nothing.

These and other scenarios are addressed by embodiments of the technology detailed herein.

Instead of identifying programs using text-based search, certain embodiments of the present technology identify programs by their audio or video content. That is, a cell phone or other such device serves as a media "forager"—employing its microphone or camera to capture some of the media content in the user's environment, and then use this captured data to automatically identify the content. Once identified, a great number of operations can be performed.

The foregoing and other features and advantages of embodiments of the present technology will be more readily apparent from the following detailed description, which proceeds with reference to the accompanying drawings.

BRIEF DESCRIPTION OF THE DRAWINGS

FIG. 3 is a conceptual depiction of part of a database used in the FIG. 1 embodiment.

FIG. 4 is a conceptual depiction of search results to identify when a desired program may be available for recording.

FIG. 5 shows one illustrative user interface that can be employed in accordance with embodiments of the present technology.

FIG. 6 is a flow chart detailing an exemplary method that can be used with the arrangement of FIG. 5.

FIGS. 9-10 are flow charts detailing other exemplary methods using the present technology.

FIG. 12 is a flow chart detailing an exemplary method that can be used with the system of FIG. 11.

OVERVIEW

Figure 1:
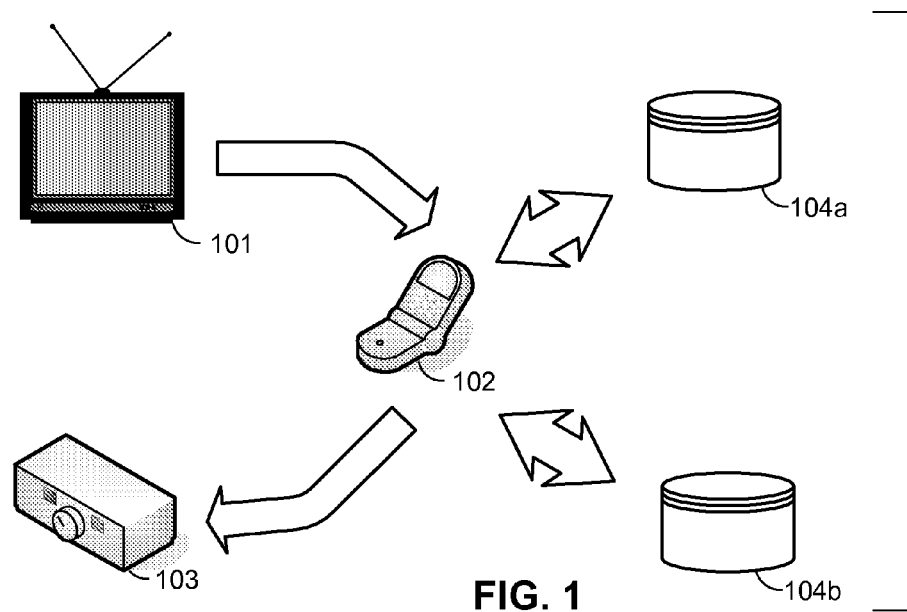
FIG. 1 is a depiction of one embodiment of the present technology.

Consider the example of the traveler who sees part of a television show of interest in an airport lounge. In accordance with one aspect of the present technology the traveler launches a "media forager" mode on his cell phone, which causes the phone's camera or microphone to sample an excerpt of imagery or audio from the television. From the sampled excerpt, the phone—or a remote system, derives an identifier (e.g., it decodes a digital watermark, or computes a fingerprint). This derived identifier is then used to query a database to learn the identity of the television program.

Once the program has been identified by the database, the cell phone can instruct a digital video recorder (e.g., at the traveler's home) to immediately start recording a remainder of the program.

Alternatively, or in addition, an electronic program guide (EPG) can be searched for instances when the identified program will be available in the future. In this case the DVR can be instructed to record the program in its entirety at the future date/time.

In still other arrangements, with knowledge of the identity of the sampled program, the cell phone can be used to order delivery of the full program at a later time (e.g., by video on demand), or to request delivery of a disc copy of the program (e.g., by a service such as Netflix).

In addition to identifying the program, the database may have information about programming before and after the sampled excerpt. This additional information enables still further features.

Consider the example of the traveler who wishes—too late—he'd recorded a documentary, after seeing its final moments. In this case the traveler launches the media forager mode, and captures an excerpt of ambient audio from the television. Since the documentary has ended, the audio is now from a Toyota commercial.

The audio excerpt is processed to extract an encoded digital watermark. The watermark indicates the audio was sampled from a KOIN television broadcast, at 9:59:04 pm on Nov. 6, 2008. This information is used to query a database, which gives the lineup of programming transmitted by KOIN television around the time of the sampled excerpt. From the screen of his cell phone the traveler sees that before the Toyota commercial (and before a Miller beer commercial that preceded it), a documentary entitled "How Do They Do It? Navigating the Panama Canal" was aired. With a few more manipulations of his cell phone, the traveler learns that the same show will be broadcast at 3:00 a.m. on a travel channel of his home cable system, and instructs his home DVR to make a recording.

In some arrangements, programming is delivered directly to the cell phone. Consider the traveler who saw only the concluding seconds of a football game in the airport lounge. After hearing some of the animated post-game commentary, the traveler decides he'd like to view plays from the game's fourth quarter on his iphone, while flying.

As before, the traveler uses the phone to capture audio from the television—now airing a Nike commercial. After a bit of processing the iphone obtains the program lineup around the Nike commercial, and presents it with Apple's "cover flow" user interface. With the touch screen the traveler scrolls backwards and forwards through key frames that represent different segments of the football game and advertising. He highlights four segments of interest, and downloads them from an NFL portal where he has an account. (He also notes a favorite E-Trade commercial—the baby trading stocks, and downloads it too.) After his plane reaches its cruising altitude, he and a seatmate view the downloaded video on the seatback in front of them, using a pocket micro-projector. (This arrangement may be regarded as use of a cell phone as a mobile virtual DVR.)

Other aspects of the present technology allow users to interact with their home television systems through one or more auxiliary screens, such as cell phones and laptops.

In one illustrative arrangement, several roommates are watching the Phillies play a World Series game on television. Two of them activate a "second screen" mode on their cell phones—a process that starts with the phones sampling the ambient sound. Hidden in the broadcast audio is a digital watermark, conveying broadcaster ID and timestamp data, allowing identification of the program being watched. Responsive to this identification, each cell phone user is presented a menu of "second screen" choices related to that program. One elects to view detailed statistics for the at-bat player. The other elects to view streaming MLB video from a camera that focuses on the Phillies manager, Charlie Manuel.

Another roommate has a cell phone with a tiny screen—too small for a second screen experience. But he's brought a laptop for occasional diversion. He activates his phone's "extra screen" mode, which is like the just-described "second screen" mode, but transmits data from the phone to other devices (e.g., the laptop), e.g., by Bluetooth. This data allows the laptop to serve as the second screen. On the laptop this third roommate chooses to join a Yahoo! group of former-Philadephians, now living in the Seattle area, chatting online about the game.

In the arrangements just-discussed, the cell phone samples television output to identify a television program. In other arrangements, a similar principle is applied to identify the television system itself. That is, the television (or associated equipment, such as a satellite receiver or DVR) subtly modifies program audio (or video) to encode an identifier, such as a TiVo account name. A cell phone discerns this identifier, and—with knowledge of the particular system being watched—control facets of its operation. For example, the cell phone can serve as a second screen on which a user can scroll through existing recordings, delete programs no longer of interest, see what recordings are planned for the day, view a local copy of the electronic program guide, etc. This allows, e.g., one spouse to watch full-screen television, while another browses the listing of recorded programs and performs other operations.

The foregoing examples are provided as an overview of some of the many embodiments possible with the present technology. As will be apparent, this is just a sample of a much larger collection of embodiments that are possible and contemplated.

DETAILED DESCRIPTION

Referring to FIG. 1, a first aspect of the present technology employs a television 101, a cell phone device 102, a digital video recorder (DVR) 103, and one or more databases 104a, 104b.

Briefly, a user operates the cell phone to capture ambient content (e.g., audio) from the television. Plural-bit auxiliary information earlier encoded into the audio as a steganographic digital watermark is decoded, and used to query a database. In response, information is returned to the cell phone and presented to the user—identifying the television program to which the captured audio corresponds.

The user can then operate the cell phone to instruct DVR 103 to start recording a remaining portion of the identified program. However, this yields just a partial recording. To obtain a full recording, an electronic program guide database is searched to determine whether the identified program is scheduled for rebroadcast at a future time. If so, the DVR can be programmed to record the full program at that future time.

Figure 2:
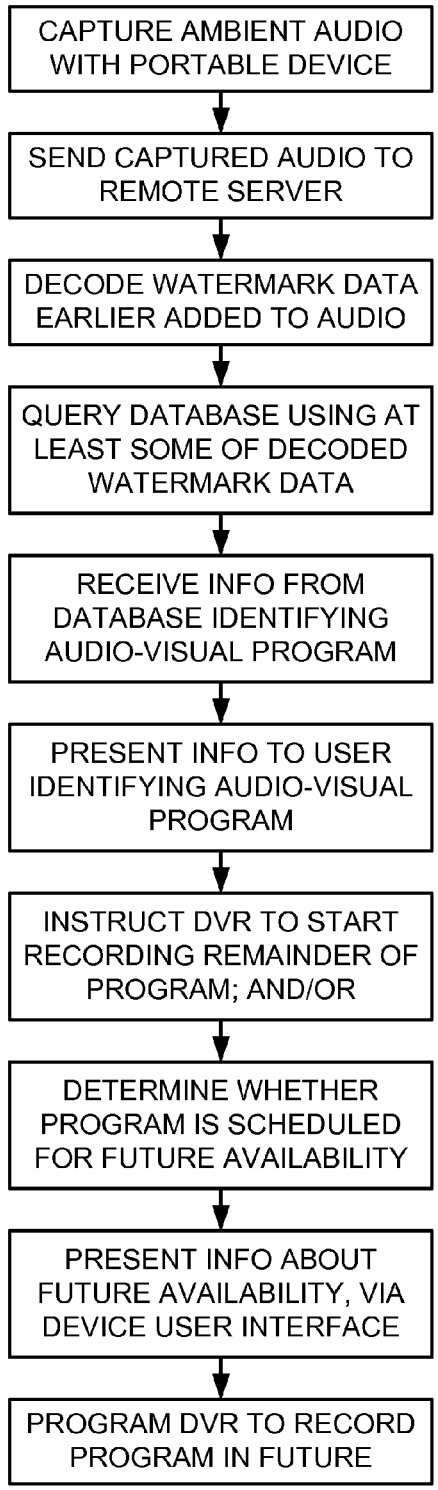
FIG. 2 is a flow chart detailing an exemplary method that can be used with the system of claim 1.

This particular method is shown in the flowchart of FIG. 2.

Cell phone device 102 can be of any format or variety, and includes conventional components. Among these are a display, a wireless transmitter and receiver, and a user interface. The device is controlled by a microprocessor that executes operating system programs, and optionally application programs, read from a memory. It also includes one or more sensors for capturing input from the environment ("foraging").

The term cell phone as used in this disclosure is meant as a shorthand for any portable multi-function device, including not just cellular telephone devices, such as the Apple iphone and the Google-standardized Android (e.g., the T-Mobile G1), but also portable digital assistants (PDAs) and portable music players (iPods), etc.

The sensor on the device can comprise a microphone for capturing sound. Alternatively, or additionally, the sensor can comprise a 2D optical sensor and a lens arrangement—permitting the device to capture imagery and/or video.

Traditionally, the user interfaces on such devices have comprised plural buttons. Increasingly, however, "touch" interfaces are growing more popular. The iTouch interface introduced by Apple in its iPhone and iPod products is disclosed, e.g., in patent publication 20080174570.

As noted, in a particular embodiment generally shown by FIG. 1, the cell phone 102 captures ambient audio output from a speaker of television 101. This audio bears a digital watermark signal that was inserted by a local broadcaster (e.g., KOIN television), prior to its over-the-air transmission. (Watermarks can be inserted by many other parties, as detailed below.)

In the exemplary arrangement, the watermark repetitively conveys two items of information: a source ID, and a time stamp. The source ID is a bit string that uniquely identifies KOIN television as the source of the content. The time stamp is an incrementing clock that gives the date and time of the broadcast. (More particularly, the source ID has two parts. The first generally identifies the network from which the content is distributed, e.g., CBS, ESPN; the second identifies the local outlet, e.g., KOIN television, Comcast cable-West Portland, etc. The time clock increments in intervals of a few seconds.)

The encoders that insert watermarks in television audio are part of an existing network employed by The Nielsen Company to help track television consumption. Nielsen maintains a database that details the program lineup for each channel in each geographic market and national network, by date and time. This database is fed by program guide information compiled by vendors such as Tribune Media Company and/or TV Guide (Macrovision). To identify a program from a watermark, the watermark ID/time stamp are input as a query to the database, and the database returns output data identifying the program that was airing on that television source at that time.

A conceptual depiction of part of this database is shown in FIG. 3. As can be seen, records are indexed by source codes and time codes. Each record identifies the television content that was being distributed by that content source, at the instant indicated by the time code.

The identification of programs can take various forms. One is textual, and can comprise the title of the program (e.g., The Sopranos), optionally with other descriptors, such as episode number, episode title, episode synopsis, genre, actors, etc. An XML format can be used when expressing this information, so that different items of information can be readily parsed by computers processing this data. Sample XML descriptors can comprise, e.g., <ProgramName>The Sopranos</ProgramName>
<EpisodeNumber>42</EpisodeNumber>
<EpisodeTitle>Denial, Anger, Acceptance</EpisodeTitle>

Another way of identifying television content is by numeric identifiers. One such identifier is the International Standard Audiovisual Number (ISAN), which is ISO Standard ISO 15706. An exemplary ISAN identifier for an item of audiovisual content is:

ISAN 0000-3BAB-9352-0000-G-0000-0000-Q (Commercials and other miscellaneous audiovisual content can be identified in the same manner as traditional "programs." In this disclosure, the term "program" is meant to include commercials, etc.)

Because Nielsen has deployed a network of watermark encoders throughout the US national television system, its form of watermark encoding is the natural choice for use with the present technology. Nielsen's watermark is understood to follow the teachings of its U.S. Pat. Nos. 7,006,555 and 6,968,564. Equipment for embedding and decoding the Nielsen watermarks is available from Norpak Corporation and Wegener Corporation.

In other embodiments, other watermark technologies can be used. Arbitron, for example, is understood to use teachings from its U.S. Pat. Nos. 5,450,490, 5,764,763, 6,871,180, 6,862,355, and 6,845,360 in its audience survey technology.

Once the cell phone captures audio from the television, the encoded audio watermark can be decoded by software in the cell phone. (The software is configured to decode the Nielsen form of watermark, per its cited patents.) The cell phone can process a fixed-length sample of audio (e.g., 12 seconds), or the decoder can process incoming audio until a confidence metric associated with the decoded watermark exceeds a threshold (e.g., 99.9%). Alternatively, the cell phone can send captured audio to a remote server for watermark decoding.

In a hybrid arrangement the decoding task is distributed. The cell phone performs one or more preprocessing operations, and sends the preprocessed data to a remote server for final watermark decoding.

The preprocessing can comprise spectral filtering—limiting the audio spectrum to only those bands where the watermark is expected to be found. Another form of pre-processing is to sample the audio at a sample rate for which the server-based detector is optimized. Still another form of pre-processing is to subtract a short-term temporal average of a signal from its instantaneous value, or a corresponding operation in the frequency domain. This is sometimes termed median filtering. (See, e.g., the present assignee's U.S. Pat. Nos. 6,724,914, 6,631,198 and 6,483,927.) Yet another form of pre-processing is Fourier domain filtering. Other operations include compressing the audio in the temporal or frequency domain. For additional information on such processing, see pending application Ser. No. 12/125,840 by Sharma et al, filed May 22, 2008. In addition to other benefits, such pre-processing can anonymize other ambient audio—which might otherwise be personally identifiable.

The cell phone can stream the preprocessed data to the remote server as it becomes available, or the cell phone can package the preprocessed data into a file format (e.g., a *.WAV file), and transmit the formatted data.

(If the Nielsen watermark is used, the encoded source ID will be consistent throughout the sampled excerpt. The timestamp information will likely be mostly consistent through the sampled excerpt (e.g., usually differing only in the second, or minute). Synchronization information included in the watermark also repeats. Because of such elements of redundancy, data from several successive blocks of sampled audio may be combined—with the consistent watermark information thereby being relatively easier to decode from the host audio. Related technology is detailed in the just-cited application Ser. No. 12/125,840.)

Once the audio watermark has been decoded, it is used to look-up a corresponding record in the database 104a, to determine the television program corresponding to that source ID/timestamp data. Information from the database identifying the sampled program is sent to the cell phone 102, and presented to the user on the cell phone screen (e.g., by title, episode number, and network source). The user then has several options, which may be presented in menu form on the screen of the cell phone.

One is to do nothing further. The user has learned the identity of the program being rendered from the television, and that—alone—may be all the user wants. If the identification is relayed to the cell phone by text messaging or email, the user may archive the message for future reference.

Another option is to instruct a DVR to record the remainder of the program. Since the user knows the exact name of the program, he can use the existing TiVo cell phone or web interface to instruct his DVR to begin recording. Information presented from the database may be copied/pasted into the TiVo search screen to facilitate the process.

Preferable, however, is to automate the task. Software on the cell phone can use TiVo's web application programming interfaces (APIs) to convey the received title (and optionally network) information to TiVo's servers, together with the user's TiVo account information, to quickly instruct the user's TiVo DVR to begin recording the remainder of the program.

As noted, recording only the remaining part of the program may not be satisfactory to the user. At the user's instruction (entered through the user interface of the cell phone), or automatically, a search can be undertaken for rebroadcasts of the same program—whether on the same network or a different one.

One implementation dispatches the program title and other descriptors (e.g., episode number, original broadcast date, etc.) to a database 104b of future programming. (TV Guide makes one such database available to the public on its web site.) The cell phone software can parse the search results received from the database, and present them in menu form on the cell phone screen—allowing the user to choose among perhaps several different instances when the program will be rebroadcast. The user's TiVo DVR can be instructed to record the program at that future date/time, as described above. (The menu may also present the option of a season pass, so that all upcoming new episodes of that program are recorded.)

In another implementation, a separate database 104b is not used. Instead, when database 104a is queried for the program identification (using the watermark-decoded source ID/timestamp data), it also searches its records for future instances of the same program. Such information can be returned to the cell phone together with the program identification. The user is thus immediately informed of whether the program is scheduled for rebroadcast—permitting a more informed decision to be made about whether to record the remaining portion immediately.

FIG. 4 conceptually illustrates the results of such a search. The user sampled an in-process broadcast of episode 42 of The Sopranos, on the evening of Nov. 5, 2008, on channel 107. A search of upcoming programming (using "Sopranos" and "42" as search parameters) identified three future broadcasts of the same episode: two the next day on the same channel, and one six days later on a different channel. These items are presented to the user on the screen of his cell phone. By touching one of the entries, instructions are sent to TiVo requesting recording of the selected broadcast.

(The user is typically subscribed to a content distribution system, such as cable or DirectTV, which provides a large— but not unlimited—selection of channels. The user's content distribution system can be identified to the database as part of the search procedure (e.g., by data stored in a cookie), so only broadcasts available to the user's DVR are presented in the search results. Alternatively, the search results may be unabridged—encompassing all sources known to the database—and the filtering can be performed by the cell phone, so that only those programs available to the user are displayed.)

Figure 1A:
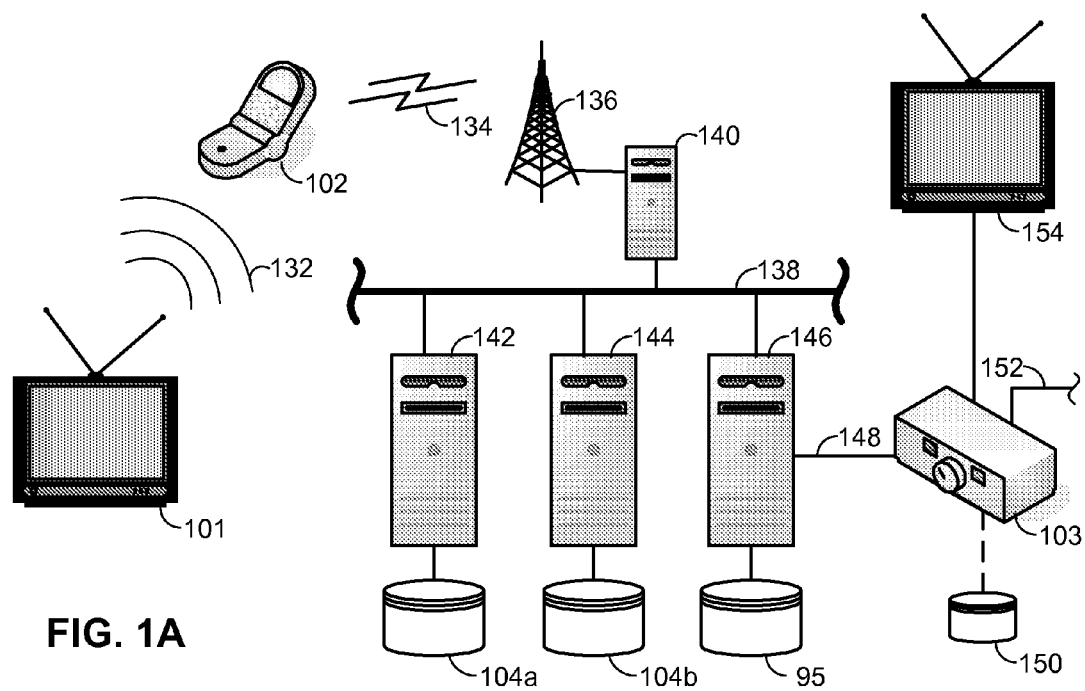
FIG. 1A is a more detailed depiction of one embodiment.

FIG. 1A shows the just-described arrangement in greater detail. Acoustic sound waves 132 emitted by a speaker in television 101 are picked-up and converted to electrical form by a microphone in cell phone 102. Corresponding information is exchanged between the cell phone and a station 136 by radio frequency signals.

The radio frequency transmission can be by various means, depending on the particular implementation. For example, the information can be transmitted during the course of a cellular telephone call, using familiar protocols such as GSM, CDMA, W-CDMA, CDMA2000, or TDMA. Or the information may be conveyed by a wireless data transmission service, such as EV-DO or HSDPA. WiFi, WiMAX, Bluetooth, and other technologies can alternatively be used.

Information received by station 136 is coupled to the internet 138 through a computer 140 (which also performs the reciprocal function of coupling information from the internet to the station 136, for transmission back to the cell phone). As is familiar, countless computers are connected to the internet. Relevant to the present discussion are computers 142, 144 and 146.

Computers 142 and 144 are associated with databases 104a and 104b, and provide their user interfaces, networking functions, etc.

Computer 146 is a server operated by TiVo. Among other functions, it provides data (including EPG data) and administrative instructions to TiVo devices, such as device 103. These services and data can be conveyed to the devices 103 by various means 148, including by phone line, by internet connection and/or by data conveyed with A/V programming distributed by cable or satellite content distribution systems. Computer 146 also presents a web-accessible interface (using various APIs implemented by software in computer 146) through which users—and the present technologies—can remotely exchange data and instructions to/from TiVos.

TiVo device 103 is coupled to a content distribution system 152 by means such as cable or satellite service. Typically included within device 103—but shown separately in FIG. 1A—is a database 150. This database serves as the data structure that maintains schedules of upcoming recordings, listings of existing recordings, electronic program guide data, etc. Device 103 also includes storage on which recordings of television programs are kept, and which buffers programs as they are received (e.g., to permit pausing and rewinding).

While the arrangement detailed above allows a user to learn the identity of a program, and capture same on a home DVR, the system may alternatively or additionally support a variety of other functions.

In one alternative, a user may have privileges associated with several DVRs. For example, Bob may permit his friend Alice to program his DVR, to capture programming that Alice thinks Bob will find interesting. Thus, when Alice uses her cell phone to recognize a program, one of the menu options presented on Alice's phone is to instruct Bob's DVR to record the program (either immediately, or at a future time—as detailed above).

In another alternative, the cell phone may present other information relating to the foraged content. If the program is a sports event, the other information may comprise player statistics, or box score data. If the program is a movie, the other information may comprise information about the actors, or about other programming in which the actors are featured. In many instances, the user may be interested in ordering products depicted in, or related to the content (e.g., a Seahawks jersey, a purse carried by a character, etc). Information about such products, and e-commerce sites through which the products can be purchased, can be provided to the users.

A separate database may be used to compile such additional information, or links to such additional information. This database may be indexed by data from databases 104a and/or 104b, and/or by the identifier derived from the foraged content, to identify associated information. Commonly-owned patent application 20070156726 details content metadata directory service technologies that can be used for this purpose.

In many embodiments, the system will identify not just the foraged content, but also related content. For example, if the foraged content is an episode of The Sopranos, the system may present information about different, upcoming episodes. If the foraged content is an NCAA hockey game between Colorado College and the University of Denver, the system may present information about upcoming hockey games involving either Colorado College or the University of Denver. (Or it may present information about upcoming games in any sport involving either of these teams. Or it may present information about upcoming NCAA hockey games, for all teams. Etc.)

The options presented to a user can naturally be customized by reference to information including location, demographics, explicit user preferences, etc. (Through such customization, for example, offers to sell program-related merchandise may be priced differently for different users.)

Collaborative processing may be used to identify other content that may be of interest to the user—based on video preferences of others who are demographically similar, or who are associated with the user (e.g., as "friends" in a social networking site).

Video identified by foraging can also be a source of still imagery for various purposes. Some television images evoke strong emotional responses in certain viewers, e.g., Michael Phelps touching the wall for his eighth gold medal in Beijing; a college team winning a championship game, etc. Users can be given the option of downloading a still image from the identified content, e.g., for use as wallpaper on a cell phone or on a laptop/PC. User interface controls can allow the user to select a desired frame from a video clip, or a representative frame may be pre-identified by the content provider for downloading purposes. (Such wallpaper downloads may be free, or a charge may be assessed—as is sometimes done with ringtones. Metadata associated with the video—or a watermark in the video—can indicate rules applicable to downloading frames as imagery.)

In response to foraged content, the user's cell phone may identify the content and present a menu listing different information and options that may be pursued. A hierarchical approach may be used, with certain menu choices leading to sub-menus, which in turn lead to sub-sub-menus, etc.

Given the decreasing costs of bandwidth and memory, however, an appealing alternative is to push all the information that may be of interest to the user to the cell phone, where it is stored in memory for possible use/review by the user. The user may quickly switch between successive screens of this information by rolling a scroll wheel on the phone, or pushing and holding a button, or by a corresponding gesture on the touch screen, etc. Such an arrangement is further detailed in application Ser. No. 12/271,692, filed Nov. 14, 2008.

In still another alternative arrangement, foraged information is stored for possible later use. This information can comprise the raw sampled content, or the pre-processed content, or information received back by the cell phone in response to foraged content. The information may be stored in the cell phone, or may be stored remotely and be associated with the cell phone (or the user).

This stored information allows the user, in the future, to identify related information that is not presently available. For example, EPG data typically details program lineup information only for the next 10 or 14 days. A user can recall foraged Colorado College hockey information from a month ago, and resubmit it to quickly identify games in the upcoming week.

(In yet other embodiments, the stored information can take the form of an entry in a personal task list (e.g., in Microsoft Outlook), or a posting disseminated to friends by services such as Twitter.)

As noted, the program lineup database can be used to identify other programs—other than the one sampled by the user. For example, it can be used to identify preceding and following programs.

In accordance with another aspect of the present technology, information identifying some of these other programs is presented to the user.

FIGS. 5 and 6 show one such arrangement. The user has sampled ambient audio from a nearby television with an iPhone (or ipod). The watermark from the audio is decoded and used to identify the sampled program, and retrieve information about surrounding programming.

Information from the database is presented in menu form on the screen of the iPhone. The sampled show is indicated by an arrow 110, or other visual effect (e.g., coloring or highlighting). Surrounding programming is also displayed. (Also indicated in FIG. 5 is the iphone's microphone 112, camera lens 114, and button 116.) In the detailed arrangement, the display indicates the source that was sampled by the user (Channel 147), and also provides title and synopsis for the sampled episode. Additionally, the display gives the lengths of surrounding program segments.

For example, before the sampled segment of The Sopranos (which is indicated as having a duration of 8 minutes 20 seconds), was a 30 second Coke commercial. Before that was a 30 second E-Trade commercial. Before that was a 7:15 segment of the program Crossing Jordan.

Following the sampled excerpt is a 30 second excerpt that is not identified. This is due to insertion of advertisement by the local broadcast affiliate—not known to the database. The length of the segment window is known, but not its content.

Following is a 30 second Apple advertisement, and a 30 second Nike advertisement.

As discussed earlier, the audio sampled by the user may be from a program segment following the one of interest. For example, the user may have wanted to capture the E-Trade commercial (about a baby stock trader who uses his profits to hire a clown)—but the moment had passed before he sampled the audio. By touching that selection on the display, the user can learn about availability of the commercial. The software conducts a search through various resources, and locates the commercial on YouTube, as video "eJqnitjqpuM." The user can then download the video, or bookmark it for later viewing.

Instead of the tabular listing of FIG. 5, video programming may be presented to the user via the iphone's "cover flow" user interface. In this embodiment (shown in FIGS. 7-8), different items of video content are represented by panes—each like an album cover. By gestures on the screen, the user can advance forwards or backwards through the panes—reviewing different items of content.

The panes may simply provide textual descriptions for the segments. Date and time, and other information, may be included if desired. Or, if available, the panes may depict key frames from the video (e.g., identified based on scene changes, such as five seconds after each scene change). If the user clicks on a pane, the pane flips over, revealing additional information on the back (e.g., program synopsis, opportunities to purchase merchandise, etc.).

The user interface can permit panes to be selected, and corresponding information to be stored—serving as content bookmarks. When later recalled, these bookmarks provide data by which the user can quickly navigate to desired excerpts of content.

Figure 8:

As shown in FIG. 8, different types of content may be represented differently in the graphical interface. Feature presentations, for example, may have bold borders, while commercials may have modest borders. Different colors or highlighting can be used to similar effect.

Since it is increasingly easy for consumers to skip commercials, the day may soon come where inducements are offered for consumers to view commercials. Commercials for which there is a viewing reward may be highlighted in the interface. If the user selects one or more such commercials for viewing, he may receive a reward—such as a nickel off his next iPhone or TiVo bill for each commercial.

Figure 7:
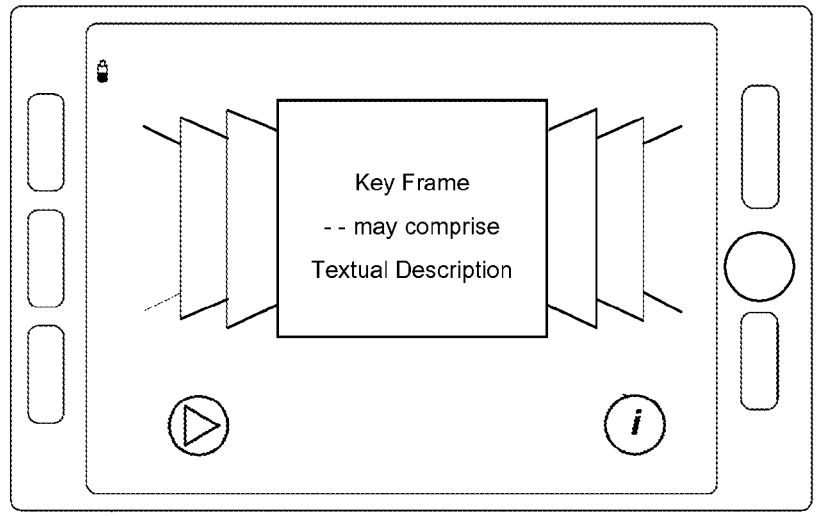
FIGS. 7 and 8 illustrate aspects of a "cover-flow" user interface.

In addition to using the interfaces of FIGS. 7 and 8 for reviewing descriptions of content, they can also be used as navigational tools. For example, the user may download content, and use the interface to select a point from which rendering should begin. Similarly, the user can "rewind" and "fast forward" by selecting different points in a sequence of video segments.

It will be recognized that use of the {source ID/timestamp} watermark detailed above is illustrative only. Other watermarks can be used in other embodiments.

One alternative watermark embeds another form of identifier, such as a unique ID. Again, a database can used to resolve the embedded identifier into associated metadata.

Watermark data can be encoded anywhere in the content distribution chain. Content may be encoded by a rightsholder who originally produced the content (e.g., Disney). Or it may be introduced by the network that distributed the content (such as NBC). Or it may be inserted by a broadcaster who transmitted the program over the air in a given geographic region (e.g., the Nielsen arrangement). Or it may be inserted by a national or regional content distribution service, e.g., using cable or satellite distribution (e.g., Comcast or DirectTV). Etc. Any device or system through which content passes can add a watermark. (The content may convey multiple watermarks by the time it reaches the user. These can co-exist without interference.)

In another embodiment, the sampled content is a promotion (promo) for another item of content. For example, a television advertisement may promote an upcoming television program. Or a talk show guest may tout a soon-to-be-released movie. Or a song on the radio may promote an associated music video. Etc.

In this case, the watermark should allow identification of metadata not simply related to the encoded content (e.g., the advertisement, or talk show program, or song), but also allow identification of the other content to which the sampled content referred (e.g., the upcoming program, the soon-to-be-released movie, or the music video).

Figure 10:
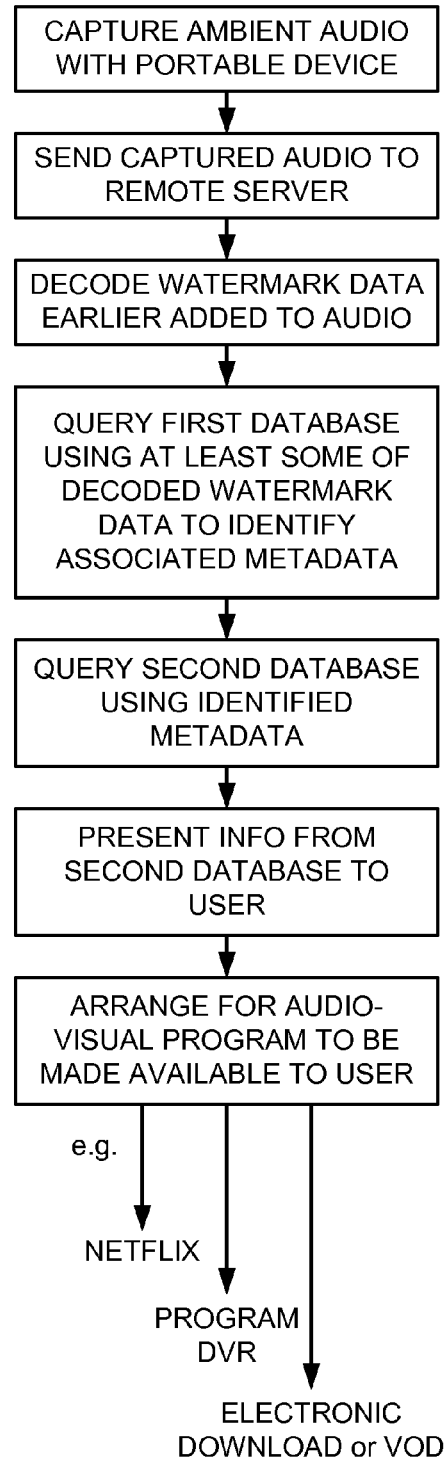

FIG. 10 is a flow chart of such an arrangement.

As before, a cell phone is used to capture ambient audio, and watermark information is decoded. A database is queried to obtain metadata relating to the watermark. The metadata may identify the source program, and/or another content item to which it relates (e.g., a movie promoted by an advertisement or a talk show).

A second database query is then performed to determine availability of the desired content (e.g., the movie). The database may be a television electronic program guide, as detailed earlier. Or it may be a listing of movies available for video-on-download from the user's cable service. Or it may be the Netflix database of movies available (or soon-to-be-available) on physical media. Or it may be an index to content on an internet site, such as YouTube, Hulu, etc.

One or more sources of the desired content are presented to the user on the screen of his cell phone. He then selects the desired source. Arrangements are then electronically made to make the desired program available from the desired source. (For example, the user's DVR may record a future broadcast of the movie. Or an order can be placed for the movie on video-on-demand, at a time selected by the user. Or the content can be streamed or downloaded from an online site. Or the movie may be added to the user's Netflix queue. Etc.).

(As in the arrangements earlier described, a single database may be used in this embodiment, instead of two.)

Figure 11:
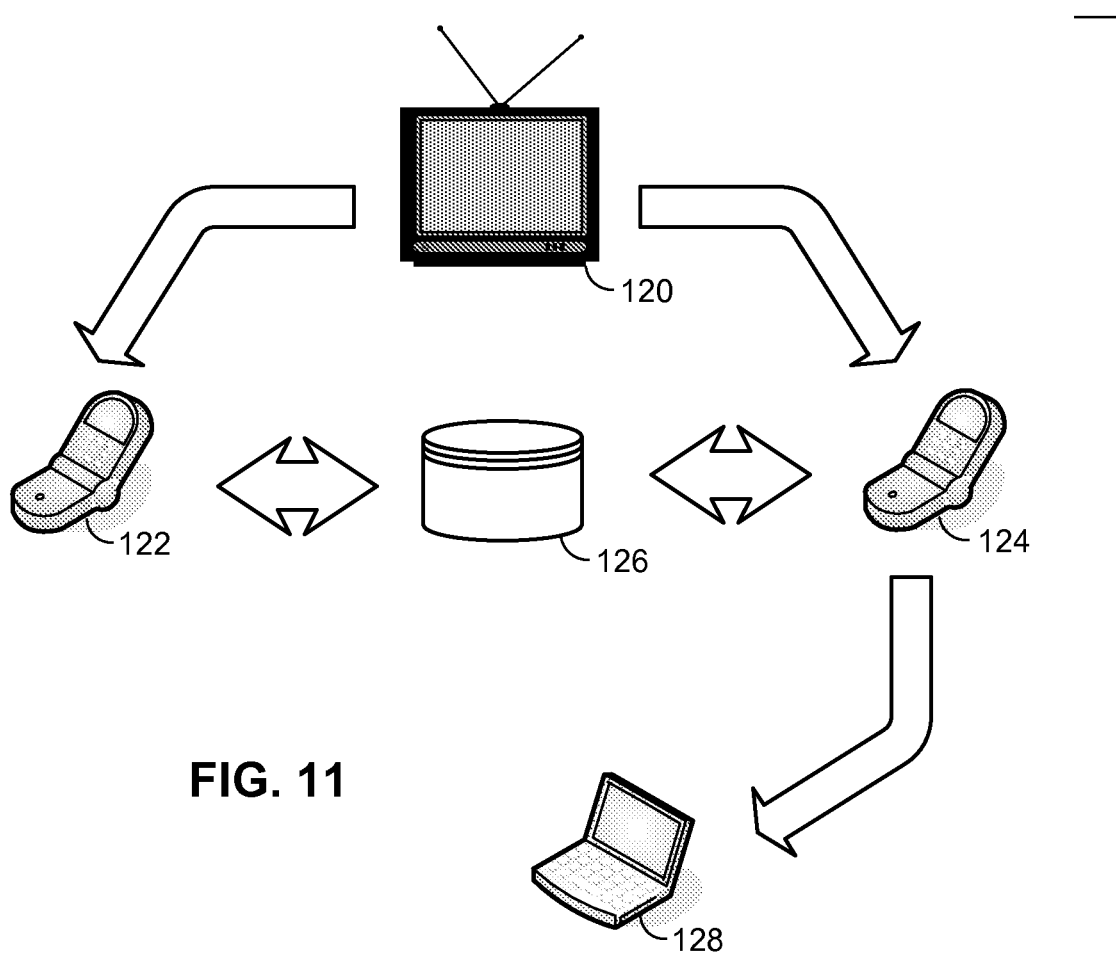
FIG. 11 is a depiction of another embodiment of the present technology.

Yet another family of embodiments is shown in FIG. 11. In these arrangements, the screen of the television 120 is complemented by one or more other screens, such as on cell phones 122, 124, and/or laptop 128.

In one such embodiment, cell phone 124 is used to capture an audio excerpt of a program being rendered by the television 120. This audio is processed to derive an identifier, which is then used to query a database 126. In response, the database provides identification of the television programming. Through use of this program identifier, information is displayed on the laptop 128 relating to the television program.

In particular, once the identity of the television program is known to the laptop, the laptop can load related content. For a baseball game, for example, it can load statistics, streaming video from cameras focused on certain players, connect to related chat discussions, etc.

In this embodiment, as in the other embodiments disclosed in this specification, the identifier extracted from the sampled content need not be a digital watermark. It can be a content fingerprint instead. Whereas watermarks are formed by subtle but deliberate alterations to content, content fingerprints simply characterize some existing attribute(s) of the content.

One form of audio fingerprinting said to be suitable with ambient audio is disclosed in Google's patent application 20070124756. Another is disclosed in U.S. Pat. Nos. 6,990,453 and 7,359,889 to Shazam. Still other fingerprinting techniques are disclosed in Nielsen's patent publications 20080276265 and 20050232411. (Nielsen maintains a fingerprint database by which it can identify broadcast television by reference to audio fingerprints.)

A drawback to fingerprints, however, is that they must first be calculated and entered into a corresponding database—generally introducing a latency that makes them not-yet-available when content is first broadcast. This is unlike the source ID and timestamp data conveyed by certain watermarks—which are known in advance of broadcast by reference to EPG data, and so are immediately available to identify content the first time it is broadcast.

As before, the processing of the captured content can be performed by the cell phone, or by a remote system. The program identifier returned from the database can go to the cell phone for display to the user, and then be forwarded to the laptop (e.g., by Bluetooth). Alternatively, information sent by the cell phone to the database can include the IP address or other identifier of the laptop, permitting the program identification to be returned directly to the laptop.

A related embodiment (also depicted by FIG. 11) employs the television 120, and two cell phones 122, 124. As before, each cell phone samples content from the television, to derive an identifier. (Or one phone can perform these operations, and transmit the results to the other.) A database 126 is queried with the identifier to identify the television program.

With reference to the program identification, the first cell phone presents a first display of information related to the program being rendered by the television, whereas the second cell phone presents a second, different display of information related to that program.

In another method, a pocket-sized communications device uses its microphone or camera to capture audio or imagery emitted from a television system (which may comprise elements such as a settop box, a DVR, a BlueRay disc player, a satellite receiver, an AppleTV device, etc.). By reference to the captured data, an identifier is determined. Then, by reference to this identifier, information is presented to a user on a second screen—other than the television system screen—relating to operation of that particular television system.

In this arrangement, the identifier may serve to identify the television system—rather than the content that is being rendered. One way of achieving this is to slightly texture the television screen, so that the texturing imparts a system-identifying watermark to imagery presented on the screen (and captured by the portable device). Or video processing circuitry in the system can slightly modulate the video signal to embed an imperceptible watermark in all displayed video. Or audio processed by the television system can be subtly altered to impose a system-identifying watermark on the output.

Knowing the identity of the particular system, a variety of operations can be performed. For example, the second screen can present program guide information for programming to which the system is subscribed. Or it can present listings of programs recorded by that system, or scheduled to be recorded. Other parameters of a DVR portion of the system can similarly be viewed and, if desired, set or altered. (This is performed by issuing instructions over the web, using TiVo's web API, directing the system's TiVo recorder to undertake the requested operations.)

As before, while the output of the television is sampled by a cell phone, a laptop can be used as the "second screen" with which the user thereafter interacts. Or, the screen of the cell phone can be used.

If the identity of the particular system is known (either by foraging the information—as above, or otherwise entered into the device, then content stored in the system's storage (e.g., recorded television programs) may be requested by the cell phone, streamed onto the internet, and rendered by a browser on the cell phone. Real-time broadcasts can also be relayed in this fashion. If the system and the cell phone are equipped to communicate wirelessly, e.g., by Bluetooth, then the cell phone can request the system to transfer the content by that means.

It will be recalled that "interactive television" was much-heralded in past decades, and promised a great variety of user-customized television experiences. While a number of reasons have been offered to explain the market failure of interactive television, the present inventors believe an important factor was trying to overlay too much information on a single screen. By the "second screen" and "other screen" approaches detailed in this specification, interactive television experiences can extend onto screens of cell phones (and laptops)—giving that old technology new potential.

In similar fashion, the large body of technologies concerning electronic program guides can also be extended to cell phone screens. Inventor Davis is named as inventor on a collection of patents detailing EPG systems, including U.S. Pat. Nos. 5,559,548, 5,576,755, 5,585,866, 5,589,892, 5,635,978, 5,781,246, 5,822,123, 5,986,650, 6,016,141, 6,141,488, 6,275,268, 6,275,648, 6,331,877, 6,418,556, 6,604,240, and 6,771,317. Google recently detailed its visions for EPG technology in patent publication 20080271080. Using the arrangements detailed herein, teachings from these other patent documents can be leveraged for use on cell phone devices.

It will be recognized that embodiments such as detailed in this disclosure can provide valuable market intelligence to media companies and advertisers who are interested in determining how media is consumed, who influences whom, etc.

To illustrate, information may be captured from system operation showing that a user sampled audio from episode 42 of The Sopranos, transmitted by WSB in Atlanta at 8 pm on Nov. 5, 2008, and—based on that impression—instructed his home TiVo in Seattle to record the same episode on channel 344 on November 11.

Still more detailed information can be collected when different media outlets tag content to permit their separate identification. For example, YouTube may add its own watermark to videos uploaded to its site, e.g., identifying YouTube, the uploading user and the upload date. The social networking site MySpace may add a watermark when video is downloaded, identifying MySpace and the download date. Etc.

By such arrangements it may be learned, for example, that a user in Tennessee—viewing a YouTube video on November 15—sampled an episode of the program Family Guy, and instructed the DVR of a friend in Toronto to record the episode of that series airing in Toronto the next day. Further data mining may show that the friend in Toronto ordered a season pass to Family Guy on November 17. (The provenance of the YouTube video may also be determined, e.g., it was aired by WNBC in New York on November 2, and was uploaded to YouTube that same evening by a user in zip code 07974—anonymized due to privacy concerns.)

Having described and illustrated the principles of our technology by reference to a variety of embodiments, it will be apparent that the technology is not so limited.

For example, while reference was repeatedly made to sampling audio output from a television, in other embodiments video can be sampled, e.g., using the camera of a cell phone. Watermarks and fingerprints can be derived from the captured image/video data, and used as detailed above.

Similarly, while the disclosure contemplates outputting information to the user on cell phone (or other) display screens, other outputs can be used—such as audible output (e.g., synthesized speech). Likewise, while user input through buttons and touch screens is conventional, other embodiments can respond to spoken voice commands (e.g., through voice recognition technologies).

DVRs are usually home-based devices. But they need not be so. Embodiments of the present technology can use all manner of recording devices—wherever located. (Cablevision is offering a consumer DVR service where the actual recording is done at a head-end in a cable distribution system.)

Although disclosed as complete systems, subcombinations of the detailed arrangements are also separately contemplated. For example, using a cell phone to forage content from a television program, and display information relating to the program on the cell phone screen, can be performed without any subsequent acts (e.g., recording using a DVR).

Little mention has been made of fees for the services detailed above. Naturally, some may be provided free of charge, while fees may be assessed for others. Fees may be billed by the provider of cellular or data services to the cell phone, by the content distribution company that provides content to the DVR, or otherwise. A periodic subscription charge can be levied for some services, or charges can be billed on a per-event basis (e.g., 10 cents to program a DVR based on information gleaned by content foraging). These revenues can be shared between parties, e.g., with part going to TiVo, and part going to the parties that provide the software functionality for the cell phones (e.g., cell phone companies).

It will be recognized that the databases noted above are illustrative only. Many variations in arrangement, and database contents, can naturally be made—depending on circumstances. Similarly with the information relayed to the cell phone or other devices for display/action. E.g., titles alone may be presented, or much richer collections of data can be employed.

The identifiers referenced above, e.g., derived as watermarks, or indexed from databases, may be arbitrary (e.g., the 1DA7 source ID of FIG. 3), or they may have semantic value (e.g., as is the case in the timestamp data, which conveys meaning). In other embodiments, different identifiers can naturally be used.

Some cell phones apply signal processing (e.g., lossy compression) to captured audio that can degrade recognition of foraged content. In next-generation cell phones, the raw audio from the microphone may be made separately available, for use by automated systems like the present technology. Similarly, next-generation phones may always buffer the last, e.g., 10-20 seconds of captured audio. By pressing a dedicated button on the phone's user interface (or activating a feature in a gesture user interface, etc.), the buffered data can be processed and transmitted as detailed above. (The dedicated button avoids the need to otherwise launch the forager software application, e.g., by navigating menus.) Similar arrangements are detailed, in the context of cell phone-captured image data, in application Ser. No. 12/271,692, cited above.

While the present disclosure focused on data captured from the ambient environment, e.g., from a sensor that captures audio (or imagery) rendered by a speaker (or presented on a screen), the detailed technology likewise finds applications where the audio (or imagery) is provided in electronic form without use of a sensor or rendering. For example, the functionality detailed herein can be provided in software running on a PC or cell phone, and operative in connection with content delivered to and processed by such device. Or electronic content on a first device can be made available to a second device over a wired (e.g., USB) or wireless (e.g., Bluetooth) link, and processed by the second device in the manners detailed. An example of such an arrangement is content wirelessly transferred to a user's Zune music player, and thereafter downloaded to his computer when the Zune player is docked. When processing of content data is performed in such contexts, additional market intelligence information is available (e.g., concerning the devices and software with which the content was used).

FIG. 5 showed one arrangement for presenting program segment data to users. A great variety of other arrangements can be employed, as is amply shown by the diversity of electronic program guides that have been developed. The presentation of segment lengths, in absolute minutes, is of course illustrative. This information, if desired, can be presented in many other fashions—including graphically, by numeric offsets from the present time, etc.

Depending on the application, information about commercials and other programs may or may not be desired. Modification of the detailed embodiments to include, or exclude, commercials and related data is well within the skill of the artisan.

It will be recognized that the cover flow sequence of FIG. 8 can be adopted to present EPG program data, e.g., showing a series of temporal sequence of programs on a given channel, or a selection of programs available at a given time across set of plural channels.

While reference was made to laptops, it will be understood that this is shorthand for a larger class of devices, including netbooks and tablet computers. The "pocket test" is one possible test: anything that can fit in a pocket may be regarded as a "cell phone." Any larger device that can be run without access to AC power may be regarded as a "laptop."

Similarly, it should be understood that use of the word "broadcast" in this disclosure is not meant to be limited to over-the-air transmission of television signals in a narrow context. Instead, any simultaneous distribution of content to multiple destinations is regarded as a broadcast.

While the detailed embodiments focused on sampling output from televisions, it will be recognized that the detailed media foraging principles are more generally applicable. For example, a consumer may forage for content in a movie theatre, in a nightclub, or anywhere else that audio or imagery may be sampled. Moreover, one cell phone may forage content audibly or visibly rendered by another cell phone.

(While through-the-air capture of content is preferred, principles of the present technology can also be applied on contexts where content is available to a foraging device in another fashion, e.g., by wireless or by wire.)

The present assignee has published a great deal of information about related systems and technologies in the patent literature—a body of work with which the artisan is presumed to be familiar. Included are patents concerning watermarking technologies (e.g., U.S. Pat. Nos. 6,122,403 and 6,590,996), and associating content with related metadata (e.g., U.S. Pat. Nos. 6,122,403, 6,947,571 and 20070156726).

The design of cell phones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a microphone, etc., together with software instructions for providing a graphical user interface), and an interface for communicating with other devices (which may be wireless, as noted above, and/or wired, such as through an Ethernet local area network, a T-1 internet connection, etc).

The functionality detailed above can be implemented by dedicated hardware, or by processors executing software instructions read from a memory or storage, or by combinations thereof. References to "processors" can refer to functionality, rather than any particular form of implementation. Processors can be dedicated hardware, or software-controlled programmable hardware. Moreover, several such processors can be implemented by a single programmable processor, performing multiple functions.

Software instructions for implementing the detailed functionality can be readily authored by artisans, from the descriptions provided herein.

Typically, each device includes operating system software that provides interfaces to hardware devices and general purpose functions, and also include application software which can be selectively invoked to perform particular tasks desired by a user. Known browser software, communications software, and media processing software can be adapted for uses detailed herein. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a remote server, different tasks can be performed exclusively by one device or the other, or execution can be distributed between the devices. Extracting watermark or fingerprint data from captured media content is but one example of such a task. Thus, it should be understood that description of an operation as being performed by a device is not limiting but exemplary; performance of the operation by another device, or shared between devices, is also contemplated.

To provide a comprehensive disclosure without unduly lengthening this specification, applicants incorporate by reference the patents, and patents applications referenced above. (Such documents are incorporated in their entireties, even if cited above in connection with specific of their teachings.)

The particular combinations of elements and features in the above-detailed embodiments are exemplary only; the interchanging and substitution of these teachings with other teachings in this and the incorporated-by-reference patents/applications are also expressly contemplated and intended.

We claim:

1. A method for remotely programming a video recorder, comprising the acts:
    with a user-carried, microphone-equipped portable device, capturing ambient audio;
    decoding plural-bit auxiliary information added to the audio as a steganographic digital watermark prior to its capture;
    querying a data structure with at least part of the decoded information;
    as a result of said querying, receiving information identifying an audio-visual program to which the captured audio corresponds;
    with a user interface associated with the portable device, presenting information to the user identifying the audio-visual program, based on the received information; and
    determining whether said audio-visual program is scheduled for availability at some point in the future on a content distribution system to which the video recorder has access; presenting information about upcoming availability via the user interface; and programming the video recorder to record the audio-visual program at said point in the future;
    the method further including sending data corresponding to the captured ambient audio to a remote server, and decoding the plural-bit auxiliary information at the remote server.

2. The method of claim 1 wherein the decoding comprises decoding using a processor in the portable device.

3. The method of claim 1 that further includes receiving a user command entered through the user interface, and programming the video recorder to record the audio-visual program at said point in the future in accordance with the received user command.

4. A method comprising the acts:
    with a user-carried, microphone-equipped portable device, capturing ambient audio;
    decoding plural-bit auxiliary information added to the audio as a steganographic digital watermark prior to its capture;
    querying a first data structure with at least part of the decoded information;
    as a result of querying the first data structure, identifying metadata associated with content to which the captured audio corresponds;
    querying a second data structure using certain of the identified metadata, the first and second data structures comprising the same data structure;
    as a result of querying the second data structure, receiving information about availability of an audio-visual program to which the captured ambient audio relates;
    with a user interface associated with the portable device, presenting information to the user based on at least some of the received information; and
    arranging for the audio-visual program to be made available to the user;
    wherein the method further includes presenting information to the user indicating that the audio-visual program is or will be available for delivery to the user on a physical medium, and the arranging comprises requesting such delivery.

5. The method of claim 4 that includes capturing the ambient audio from a promo for the audio-visual content.

6. The method of claim 4 that includes capturing the ambient audio from a rendering of the audio-visual content.

7. The method of claim 4 that includes presenting information to the user indicating that the audio-visual program will, at a future point, be available on a content distribution system to which a digital video recorder has access, and the arranging comprises programming the digital video recorder to record the program at said future point.

8. The method of claim 4 that includes presenting information to the user indicating that the audio-visual program is or will be available for delivery to the user, and the arranging comprises requesting such delivery.

9. A method comprising the acts:
    with a user-carried, microphone-equipped portable device, capturing ambient audio;
    decoding plural-bit auxiliary information added to the audio as a steganographic digital watermark prior to its capture;
    querying a data structure with at least part of the decoded information;
    as a result of said querying, receiving information identifying an audio-visual program to which the captured audio corresponds;
    with a user interface associated with the portable device, presenting information to the user identifying the audio-visual program, based on the received information;
    identifying a source from which at least a portion of the audio-visual program is, or will be, available;
    presenting an index of the audio-visual program to the user as a series of informational panes, displayed in cover-flow fashion.

10. The method of claim 9 that further includes the user navigating to a desired point in the program using the series of informational panes, and selecting same; and delivering the program to the user starting at the selected point.

11. A method involving a television, a laptop computer, and a mobile communications device, the method comprising the acts:
  with the mobile communications device, capturing an excerpt of a program being rendered by the television;
  processing the excerpt to derive a corresponding identifier;
  querying a database with the derived identifier to identify a program identifier associated with the program being rendered by the television; and
  by reference to the identified program identifier, presenting on the laptop a display of information related to the program being rendered by the television;
  wherein the communications device helps to identify the television program, and thus cooperates with the laptop computer to display information related to the program.

12. The method of claim 11 that includes:
  receiving the program identifier at the communications device;
  transferring the program identifier from the communications device to the laptop computer;
  sending a request for information from the laptop computer, the sent request including the program identifier; and
  as a consequence of the sent request, receiving information at the laptop, and presenting said display based thereon.

13. A method involving a television, a first mobile communications device, and a second mobile communications device, the method comprising the acts:
  with the first mobile communications device, capturing an excerpt of a program being rendered by the television;
  processing the excerpt to derive a corresponding identifier;
  querying a database with the derived identifier to identify a program identifier associated with the program being rendered by the television; and
  by reference to the identified program identifier, presenting on the first device a first display of information related to the program being rendered by the television;
  with the second mobile communications device, capturing an excerpt of the same program being rendered by the television;
  processing the excerpt to derive a corresponding identifier;
  querying a database with the derived identifier to identify a program identifier associated with the program being rendered by the television; and
  by reference to the identified program identifier, presenting on the second device a second, different display of information related to the program being rendered by the television;
  wherein users of the first and second devices are presented different information related to the program being rendered by the television.

14. A method involving a television system and a first mobile communications device, the television system and the device each including a screen, the method comprising the acts:
  with the first mobile communications device, capturing audio or video data from the television system;
  by reference to the captured data, determining an identifier; and
  by reference to the identifier, presenting information to a user on a screen other than the television system screen, the presented information relating to operation of that particular television system.

15. The method of claim 14 in which the identifier is associated with the television system, and serves to identify same.

16. The method of claim 15 wherein the presented information comprises program guide information for programs delivered to the television system from a content distribution system.

17. The method of claim 15 wherein the presented information relates to operation of a digital video recorder portion of the television system.

18. The method of claim 15 that includes presenting the information to the user on a screen of a laptop computer.

19. The method of claim 15 that includes presenting the information to the user on a screen of the first mobile communication device.

20. A method for interacting with audio-visual content, the method comprising the acts:
  with a mobile communications device, capturing an excerpt of a first program item being rendered by a television;
  processing the excerpt to derive a corresponding identifier;
  querying a database with the derived identifier to identify the first program item;
  also identifying from a data structure at least one different second program item that preceded or follows the first program item; and
  presenting to a user at least some of the information identified from the database, wherein said presenting comprises presenting to the user a graphical depiction of plural program items and their relative ordering.

21. The method of claim 20 in which the presenting comprises presenting at least the title of one of said program items on a screen of the mobile communications device.

22. The method of claim 20 in which the processing comprises processing an audio excerpt to decode plural-bit auxiliary data added to the audio as a steganographic digital watermark prior to its capture.

23. The method of claim 20 in which the processing comprises deriving fingerprint data from a captured audio excerpt.

24. The method of claim 20 in which the graphical depiction comprises a cover flow-like presentation of the program items and their sequence.

25. The method of claim 20 wherein said also identifying comprises identifying at least one different program item that preceded the first program item.

26. The method of claim 20 wherein said also identifying comprises identifying at least one different program item that follows the first program item.

27. A non-transitory computer readable medium containing software instructions for configuring a mobile communications device to interact with audio-visual content by acts including:
  capturing an excerpt of a first program item being rendered by a television;
  processing the excerpt to derive a corresponding identifier;
  querying a database with the derived identifier to identify the first program item;
  also identifying from a data structure at least one different second program item that preceded or follows the first program item; and presenting to a user at least some of the information identified from the database, wherein said presenting comprises presenting to the user a graphical depiction of plural program items and their relative ordering.

\* \* \* \* \*